US012608169B2

(12) United States Patent
Ogata

(10) Patent No.: US 12,608,169 B2
(45) Date of Patent: Apr. 21, 2026

(54) INFORMATION PROCESSING DEVICE, INFORMATION PROCESSING SYSTEM, DISPLAY DEVICE, AND INFORMATION PROCESSING METHOD THAT ACQUIRE A FIRST IMAGE BASED ON AN ATTITUDE OF A FIRST DISPLAY USED BY A FIRST USER AND DETERMINES THE POSSIBILITY OF COLLISION OF A SECOND USER

(71) Applicant: CANON KABUSHIKI KAISHA, Tokyo (JP)

(72) Inventor: Naoko Ogata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/907,705

(22) Filed: Oct. 7, 2024

(65) Prior Publication Data

US 2025/0036349 A1 Jan. 30, 2025

Related U.S. Application Data

(63) Continuation of application No. PCT/JP2023/001093, filed on Jan. 17, 2023.

(30) Foreign Application Priority Data

Apr. 14, 2022 (JP) ................................ 2022-067075

(51) Int. Cl.
G06F 3/14 (2006.01)
G06T 19/00 (2011.01)
(52) U.S. Cl.
CPC .......... G06F 3/1454 (2013.01); G06T 19/006 (2013.01)
(58) Field of Classification Search
CPC ........ G06F 3/1454; G06F 3/01; G06F 3/0481; G06F 3/16; G06T 19/006; G06T 19/00;
(Continued)

(56) References Cited

U.S. PATENT DOCUMENTS 6,694,194 B2 2/2004 Oda et al.
7,808,450 B2 10/2010 Wanda et al.
(Continued)

FOREIGN PATENT DOCUMENTS

JP 2002132487 A 5/2002
JP 2016224809 A 12/2016
(Continued)

OTHER PUBLICATIONS

International Search Report and Written Opinion of the ISA issued Mar. 2023, in International Patent Application No. PCT/JP2023/001093, with English translation (7 pages).

*Primary Examiner* — Brent D Castiaux
(74) *Attorney, Agent, or Firm* — Venable LLP

(57) ABSTRACT

An information processing device performs acquisition processing to acquire a first image based on an attitude of a first display used by a first user, performs determination processing to determine a possibility of collision of a second user, performs selection processing to select a display mode of a second display, and controls the second display device used by the second user. The second display device displays the first image when a first display mode is selected in the selection processing, and displays a second image based on an attitude of the second display device when a second display mode is selected in the selection processing. When the possibility of collision of the second user is high, the possibility of collision of the second user is notified to the second user using a notification form that is different in accordance with the display mode selected in the selection processing.

16 Claims, 14 Drawing Sheets

(58) Field of Classification Search
CPC ........... G09G 5/00; G09G 5/14; G09G 5/377;
H04N 7/18
See application file for complete search history.

(56) References Cited

U.S. PATENT DOCUMENTS

| | | | |
|---|---|---|---|
| 9,599,818 B2 | 3/2017 | Yamagishi et al. | |
| 10,617,956 B2* | 4/2020 | Black | A63F 13/25 |
| 10,909,759 B2 | 2/2021 | Kaino et al. | |
| 11,127,182 B2 | 9/2021 | Mirhosseini et al. | |
| 11,734,867 B2 | 8/2023 | Mirhosseini et al. | |
| 2021/0304502 A1* | 9/2021 | Chaurasia | G06F 9/542 |
| 2023/0259194 A1* | 8/2023 | Geisert | G02B 27/0101 |
| | | | 345/633 |

FOREIGN PATENT DOCUMENTS

| | | |
|---|---|---|
| JP | 2017119031 A | 7/2017 |
| JP | 2017119032 A | 7/2017 |
| JP | 2019537087 A | 12/2019 |
| JP | 2020536305 A | 12/2020 |
| WO | 2018/064081 A1 | 4/2018 |
| WO | 2019/067470 A1 | 4/2019 |

* cited by examiner

S300 — START

S300 MEASURE POSITIONAL AND ATTITUDE OF FIRST USER

S301 GENERATE XR IMAGE

S302 DISTANCE BETWEEN FIRST USER AND REAL OBJECT IS WITHIN THRESHOLD?

No

Yes

S303 SUPERIMPOSE FIRST ALERT ITEM

S900 NOTIFIED DISPLAY MODE IS SELF-VIEWPOINT MODE?

Yes

No

S304 SEND OTHER-VIEWPOINT IMAGE TO SECOND DEVICE

S305 SEND DISPLAY IMAGE TO FIRST DISPLAY DEVICE

END

INFORMATION PROCESSING DEVICE, INFORMATION PROCESSING SYSTEM, DISPLAY DEVICE, AND INFORMATION PROCESSING METHOD THAT ACQUIRE A FIRST IMAGE BASED ON AN ATTITUDE OF A FIRST DISPLAY USED BY A FIRST USER AND DETERMINES THE POSSIBILITY OF COLLISION OF A SECOND USER

CROSS-REFERENCE TO RELATED APPLICATIONS

This application is a Continuation of International Patent Application No. PCT/JP 2023/001093, filed Jan. 17, 2023, which claims the benefit of Japanese Patent Application No. 2022-067075, filed Apr. 14, 2022, both of which are hereby incorporated by reference herein in their entirety.

BACKGROUND OF THE INVENTION

Field of the Invention

The present invention relates to an information processing device, an information processing system, a display device, and an information processing method.

Background Art

In recent years, the X reality (XR) technique of integrating a virtual world and a real world in real time and thereby to create a new space (experience) is known. As a device that presents an image based on the XR technique to a user, there is a head mounted display (HMD), a tablet, or a smartphone.

Japanese Patent Application Publication No. 2017-119031 discloses a technique of a game machine that allows a user, who is viewing an XR image (or having an XR experience) as a part of the game, to recognize a dangerous situation. In the game machine, first, in a case when the user approaches (or arrives at) a specific area, the game machine performs display to prompt the user to stop moving. Then, if the user entered the specific area, the game machine performs processing to make the user hesitate viewing an XR image (at least one of processing to change the displayed image, processing to change the progress mode of the game, and processing to end the game).

Japanese Patent Application Publication No. 2002-132487 discloses a technique of sending an XR image that a specific user is viewing to a device of another user, so as to present this XR image to the other user. According to this technique, a plurality of users can view an XR image that the specific user is viewing, and have a discussion or provide instruction.

However, in the case of Japanese Patent Application Publication No. 2002-132487, it may be possible (there may be a danger) that a specific user, who is viewing an XR image of a display device of another user, moves his/her body and thereby collides with a person or an object. Here, if the technique of Japanese Patent Application Publication No. 2017-119031 is used, by displaying on the XR display an alert that indicates the possibility of collision, the user may be made to hesitate continuing the experience. But even if the technique of Japanese Patent Application Publication No. 2017-119031 is used, a certain user may not be able to correctly recognize whether this user is in danger, since this user may be looking at an XR image which includes a warning to another user.

SUMMARY OF THE INVENTION

With the foregoing in view, it is an object of the present invention to provide a technique of appropriately notifying a specific user of a possibility of collision in a case when the specific user is viewing an image that corresponds to another user.

An aspect of the present invention is an information processing device, including one or more processors and/or circuitry configured to perform acquisition processing to acquire a first image based on an attitude of a first display device used by a first user, to perform determination processing to determine possibility of collision of a second user, and to perform control processing to control a second display device used by the second user to display the first image, wherein, in a case when it is determined that the possibility of collision of the second user is high, in the control processing, the second display device is controlled such that the second user is notified of the possibility of collision of the second user using a notification form that is different from that in a case when the second user is notified of possibility of collision of the first user.

Another aspect of the present invention is a display device, including a display configured to display a first image based on an attitude of a first display device used by a first user, and one or more processors and/or circuitry configured to control processing to control the display such that, in a case when possibility of collision of a second user who uses the display device is high, the second user is notified of the possibility of collision of the second user using a notification form that is different from that in a case when the second user is notified of possibility of collision of the first user.

Another aspect of the present invention is an information processing method, including acquiring a first image based on an attitude of a first display device used by a first user, determining possibility of collision of a second user, a controlling a second display device used by the second user, to display the first image, and controlling, in a case when it is determined that the possibility of collision of the second user is high, the second display device such that the second user is notified of the possibility of collision of the second user using a notification form that is different from that in a case when the second user is notified of the possibility of collision of the first user.

Further features of the present invention will become apparent from the following description of exemplary embodiments with reference to the attached drawings.

DESCRIPTION OF THE EMBODIMENTS

Embodiments of the present invention will be described in detail with reference to the drawings. Configurations to be described in the following embodiments are typical examples, and a scope of the present invention is not always limited to these specific configurations. In the following, a distance between two objects may be a length between the center positions of the two objects, or may be a length of a space between the two objects.

Embodiment 1

Figure 1:
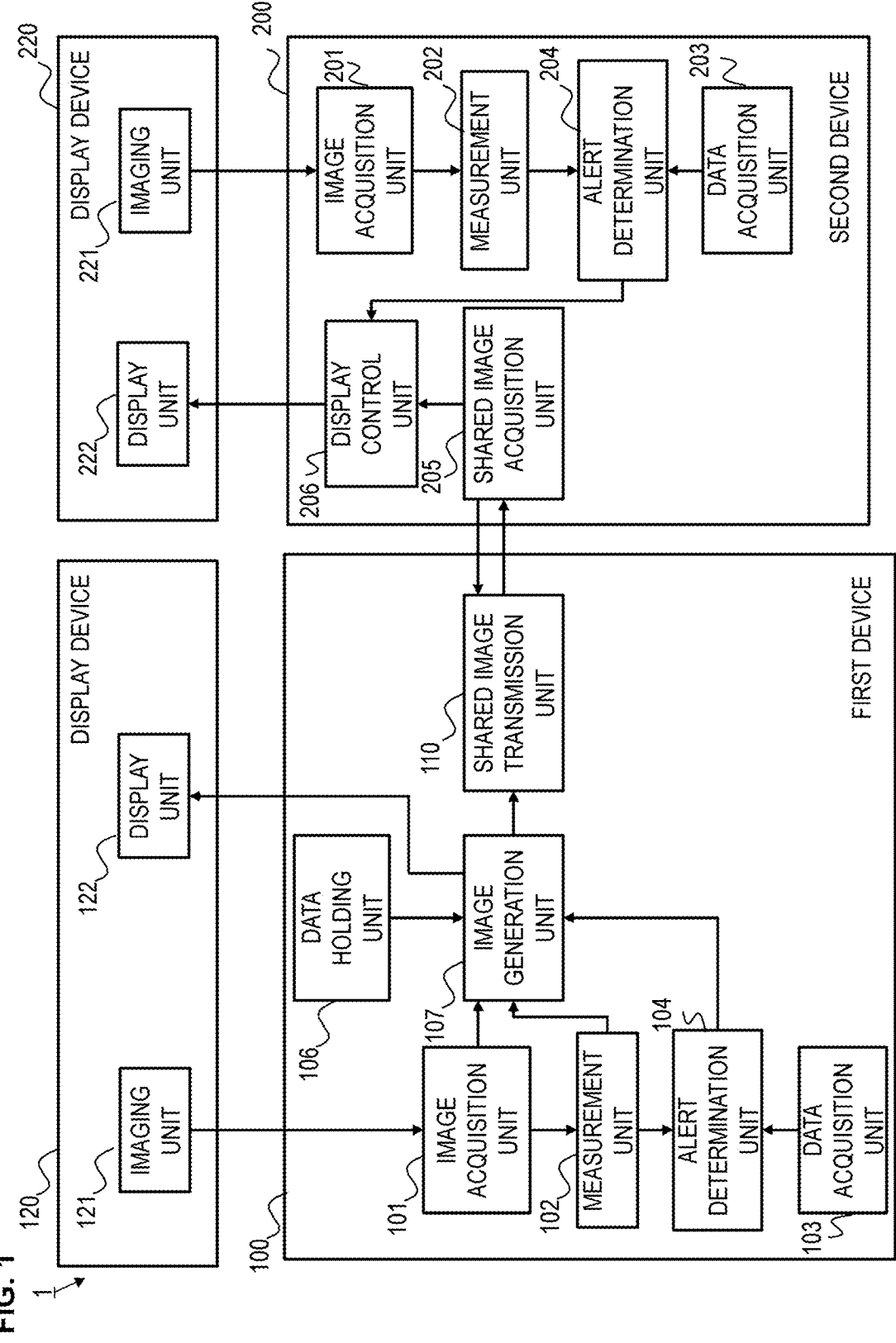
FIG. 1 is a block diagram of an information processing system according to Embodiment 1.

FIG. 1 is a block diagram of an information processing system 1 according to Embodiment 1. The information processing system 1 according to Embodiment 1 includes a first device 100, a second device 200, a display device 120 used by a first user, and a display device 220 used by a second user. The first device 100 and the second device 200 may collectively be regarded as one control system, since both the display device 120 and the display device 220 are controlled by the first device 100 and the second device 200.

The first device 100 and the second device 200 are communicable with each other. The first device 100 and the display device 120 are communicable with each other. The second device 200 and the display device 220 are communicable with each other. The communication among these components may be via cables or wirelessly.

While a plurality of users have an XR experience here, the information processing system 1 can select whether a display image one user is viewing is shared with another user. The user at the source of sharing the display image is called a "other-viewpoint sharing user". To select the "other-viewpoint sharing user", an ID or a name is set (assigned) to each of the plurality of users, and the "other-viewpoint sharing user" is selected by an operation of any of the users, for example. To select the "other-viewpoint sharing user", a method for selecting the "other-viewpoint sharing user" using a real image, as described in Japanese Patent Application Publication No. 2016-224809, is also available. In Embodiment 1, the 'other-viewpoint sharing user" is assumed to be the first user who uses (wears) the display device 120.

(Internal Configuration of First Device 100)

An internal configuration of the first device 100 will be described with reference to FIG. 1. The first device 100 is a control device (information processing device; electronic apparatus) to control the display device 120. The first device 100 includes an image acquisition unit 101, a measurement unit 102, a data acquisition unit 103, an alert determination unit 104, a data holding unit 106, an image generation unit 107, and a shared image transmission unit 110.

The image acquisition unit 101 acquires a real image from an imaging unit 121 of the display device 120. The real image is a captured image of a front (forward) range (space) of the display device 120 captured by the imaging unit 121. The image acquisition unit 101 outputs the real image to the measurement unit 102 and the image generation unit 107.

The measurement unit 102 performs image processing on the real image, and extracts characteristic information (feature information) such as points and lines in the real image. The measurement unit 102 measures a positional attitude (position and attitude) of the display device 120 based on the feature information. Then, the measurement unit 102 determines the positional attitude of the first user based on the positional attitude of the display device 120. The measurement unit 102 outputs the information on the positional attitude of the first user to the alert determination unit 104 and the image generation unit 107.

In Embodiment 1, the measurement unit 102 measures the positional attitude of the display device 120 based on the result of image processing. However, the measurement unit 102 may mechanically measure the positional attitude of the display device 120. The measurement unit 102 may measure the positional attitude of the display device 120 using infrared light or ultrasonic waves, or may measure the positional attitude using a magnetic sensor. Further, the measurement unit 102 may measure the positional attitude of the display device 120 using a depth sensor. These sensors may be included in the display device 120 or may be included in the first device 100 if the display device 120 and the first device 100 are located at similar positions.

The data acquisition unit 103 acquires information of the positional attitude and a shape of a real object (object or person in a real space). Here, the real object is an object (object other than a person) or a person of which the possibility of collision (contact) with the first user is determined. The real object includes a user other than the first user (e.g., a second user). The data acquisition unit 103 may acquire the information on the positional attitude of the second user, measured by a measurement unit 202 of the second device 200, for example, or may acquire the information on the positional attitude of the second user from a value measured by a sensor included in the display device 120. Further, the data acquisition unit 103 may assume that the shape of the second user as a predetermined shape or a cylindrical shape, for example. The data acquisition unit 103 outputs the information on the positional attitude and the shape of the real object to the alert determination unit 104 as the real object data.

The data acquisition unit 103 also acquires the information on the positional attitude and the shape of the real object based on the result of scanning the real space in advance using a known three-dimensional reconstruction technique, for example. The data acquisition unit 103 may also acquire the information on the positional attitude and the shape of the real object by acquiring a plurality of real images captured at predetermined positions (viewpoints), and measuring a depth of the real object based on parallax between the plurality of real images.

The user may register the information on the positional attitude and the shape of the real object in advance. In this case, the user may set a three-dimensional model (e.g. a model of a cube or a cylinder) containing a space that includes the real object. Then, the data acquisition unit 103 may acquire a position, where the three-dimensional model set by the user is disposed, as the position of the real object, and acquire the shape of the three-dimensional model as the shape of the real object. Further, the user may set a plane portion (two-dimensional space), where the real object is disposed, as the position of the real object.

The alert determination unit 104 determines the possibility (danger) of collision (contact) based on the positional attitude of the first user and the real object data. Then, the alert determination unit 104 determines whether it will be alerted (notified) that the possibility of collision is high. The alert determination unit 104 outputs the result of determining whether it will be alerted that the possibility of collision is high (first determination result) to the image generation unit 107. In Embodiment 1, the alert determination unit 104 determines whether it will be alerted that the possibility of collision is high (collision is possible) depending on whether the distance between the first user and the real object is within a threshold Th1. Here, the alert determination unit 104 can calculate the distance between the first user and the real object by calculating the coordinate difference between the position of the first user and the position of the real object indicated by real object data, for example. The alert determination unit 104 may also measure the distance between the first user and the real object using a distance sensor included in the display device 120. In a case when the second user is a real object, the alert determination unit 104 may receive a radio wave emitted from the display device 220, and measure the distance between the second user and the first user in accordance with the intensity of the received radio wave. As long as the user can detect the possibility of collision with a real object, the alert determination unit 104 may use other determination methods.

For example, as disclosed in Japanese Patent Application Publication No. 2016-224809, the alert determination unit 104 estimates a region where the first user is located based on the positional attitude of the first user. Then, the alert determination unit 104 may determine whether it will be alerted that possibility of collision is high, depending on whether the distance between the region where the first user is located and the real object is within the threshold Th1.

Further, in addition to the distance between the first user and the real object, the alert determination unit 104 may determine whether it will be alerted that the possibility of collision is high, also depending on whether or not the first user is viewing the display device 120. In other words, if the first user is not viewing the display device 120, the alert determination unit 104 may determine that it will not be alerted that the possibility of collision is high. In this case, the image generation unit 107 controls the display device 120 not to alert (notify) that the possibility of collision of the first user is high (not to superimpose an alert item on the XR image). In a case when the display device 120 is a hand held device (e.g. tablet), the first user is not likely to be checking the surroundings if the first user is immersed in the XR experience, hence there is more need to alert that the possibility of collision is high. However, if the first user is not immersed in the XR experience, the first user is more likely to be checking the surroundings. Hence, there is less need to alert that the possibility of collision is high. In other words, if the first user is not viewing the display device 120, there is little need to alert that the possibility of collision is high. Whether or not the first user is viewing the display device 120 can be determined by an inner camera of the display device 120 acquiring an image and detecting the line-of-sight thereby.

In other words, the alert determination unit 104 may determine to alert (notify) that the possibility of collision is high in a case when the distance between the first user and the real object is within the threshold Th1, and the first user is viewing the display device 120 in this state. In other cases, the alert determination unit 104 may determine not to alert that the possibility of collision is high.

The data holding unit 106 holds data on a virtual space. The data holding unit 106 outputs the data on the virtual space to the image generation unit 107. The data on the virtual space is data on a virtual object constituting the virtual space (information on the shape of the virtual object and information on the positional attitudes thereof), data on the light source that emits light in the virtual space, or the like.

The image generation unit 107 generates an XR image (mixed reality image) based on the positional attitude of the first user (or display device 120), data on the virtual space, and a real image. Specifically, based on an attitude (or a position and an attitude) of the display device 120, the image generation unit 107 disposes a virtual object, indicated in the virtual space data, in the real space indicated in the real image. Thereby, the image generation unit 107 generates an XR image that looks as if the virtual object was disposed in the real space. In a case when the alert determination unit 104 determined to alert that the possibility of collision is high (in accordance with the first determination result), the image generation unit 107 generates a display image by superimposing a first alert item (alert symbol) on the XR image. In a case when it is determined not to alert that the possibility of collision is high, the image generation unit 107 treats the XR image itself as a display image. The image generation unit 107 outputs the display image to the display unit 122 (display device 120). Thereby, the image generation unit 107 controls the display of the display unit 122. Further, the image generation unit 107 outputs the display image to the shared image transmission unit 110.

The shared image transmission unit 110 sends the display image to the second device 200 as a "other-viewpoint image". Here, the shared image transmission unit 110 may send an image, where the image quality or frame rate of the display image has been changed, or an image generated by extracting a part of the display image, to the second device 200 as the "other-viewpoint image".

(Internal Configuration of Second Device 200)

An internal configuration of the second device 200 will be described with reference to FIG. 1. The second device 200 is a control device (electronic apparatus, information processing device) to control the display device 220. The second device 200 includes an image acquisition unit 201, a measurement unit 202, a data acquisition unit 203, an alert determination unit 204, a shared image acquisition unit 205, and the display control unit 206.

The image acquisition unit 201 acquires a real image of a real space (space in front of the display device 220) captured by the imaging unit 221. The image acquisition unit 201 outputs the acquired real image to the measurement unit 202.

The measurement unit 202 measures a positional attitude of the display device 220, just like the measurement unit 102. Then, the measurement unit 202 determines the positional attitude of the second user based on the positional attitude of the display device 220. The measurement unit 202 outputs the information on the positional attitude of the second user to the alert determination unit 204.

The data acquisition unit 203 acquires information on the positional attitude and the shape of a real object, just like the data acquisition unit 103. Here, the real object includes a user other than the second user (e.g., a first user). The data acquisition unit 203 outputs the information on the positional attitude and the shape of the real object to the alert determination unit 204 as the real object data.

The alert determination unit 204 determines the possibility of collision (contact) of the second user based on the positional attitude of the second user and the real object data, just like the alert determination unit 104. The alert determination unit 204 determines the possibility of collision of the second user depending on the distance between the second user and the real object, or depending on whether or not the second user is viewing the display device 120, just like the alert determination unit 104. Then, the alert determination unit 204 determines whether it alerted (notified) that the possibility of collision (contact) of the second user is high. The alert determination unit 204 outputs the result of determining whether it will be alerted that the possibility of collision is high (second determination result) to the display control unit 206.

The shared image acquisition unit 205 requests the first device 100 corresponding to the first user, which is a "other-viewpoint sharing user", to send a "other-viewpoint image" (XR image). When the "other-viewpoint image" is acquired, the shared image acquisition unit 205 outputs the acquired "other-viewpoint image" to the display control unit 206.

The display control unit 206 is a control unit to control display of the display unit 222. Based on the second determination result by the alert determination unit 204 and the "other-viewpoint image", the display control unit 206 controls the display image to be displayed on the display unit 222. The control of the display image is implemented by executing processing according to a later mentioned flow chart in FIG. 3B. The display control unit 206 outputs the display image to the display unit 222 (display device 220).

(Internal Configuration of Display Device)

An internal configuration of the display device 120 will be described with reference to FIG. 1. Since the display device 120 and the display device 220 have similar configurations, a description on the internal configuration of the display device 220 will be omitted. The display device 120 includes the imaging unit 121 and the display unit 122.

The imaging unit 121 images a real space and acquires a captured image thereby, then outputs the captured image to the first device 100 as a real image. The display unit 122 displays the display image acquired from the first device 100.

In Embodiment 1, the display device 120 and the display device 220 are described as head mounted displays (HMDs), but the present invention is not limited to this. Each of the display devices may be any device, as long as an imaging unit and a display unit are included (e.g., a smartphone, a digital camera, a tablet terminal). Further, HMD is described here as a video see-through type HMD (HMD that displays an XR image, generated based on an image captured by an imaging unit, on a display unit). However, the display device 120 and the display device 220 may use an optical see-through type HMD (HMD that displays an image of a virtual space superimposed on a display medium that can be observed through the real space).

The display device 120 may include the first device 100. The display device 220 may include the second device 200. Further, the display device 120 may include the first device 100 and the second device 200. The display device 220 may include the first device 100 and the second device 200.

Figure 2:
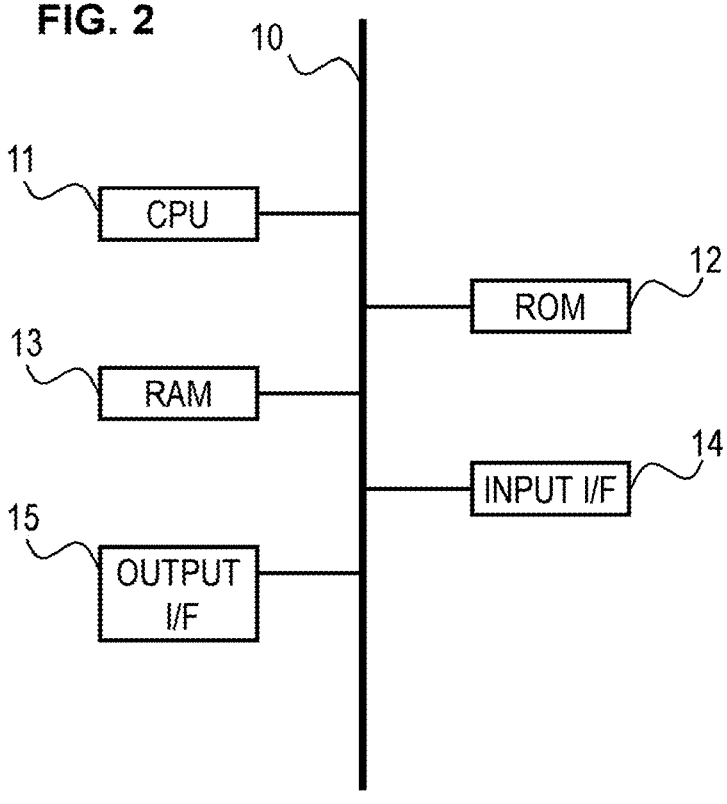
FIG. 2 is a hardware configuration diagram of a first device and a second device according to Embodiment 1.

FIG. 2 is a hardware configuration diagram of the first device 100 and the second device 200 to implement each configuration in FIG. 1. A CPU 11 comprehensively controls each device (each hardware configuration) that is connected via a bus 10. The CPU 11 reads information or program of each processing step stored in a read only memory (ROM 12), and executes the program. In the ROM 12, an operating system (OS), programs related to Embodiment 1, and such information as a device driver are stored. The CPU 11 can develop (temporarily store) the information stored in the ROM 12 in a random access memory (RAM 13) for execution. An input interface (input I/F) 14 acquires input signals from an external device in a format that the first device 100 and the second device 200 can process. An output interface (output I/F) 15 outputs signals to an external device in a format that the external device can process.

(Display Control Processing)

Figure 3A:
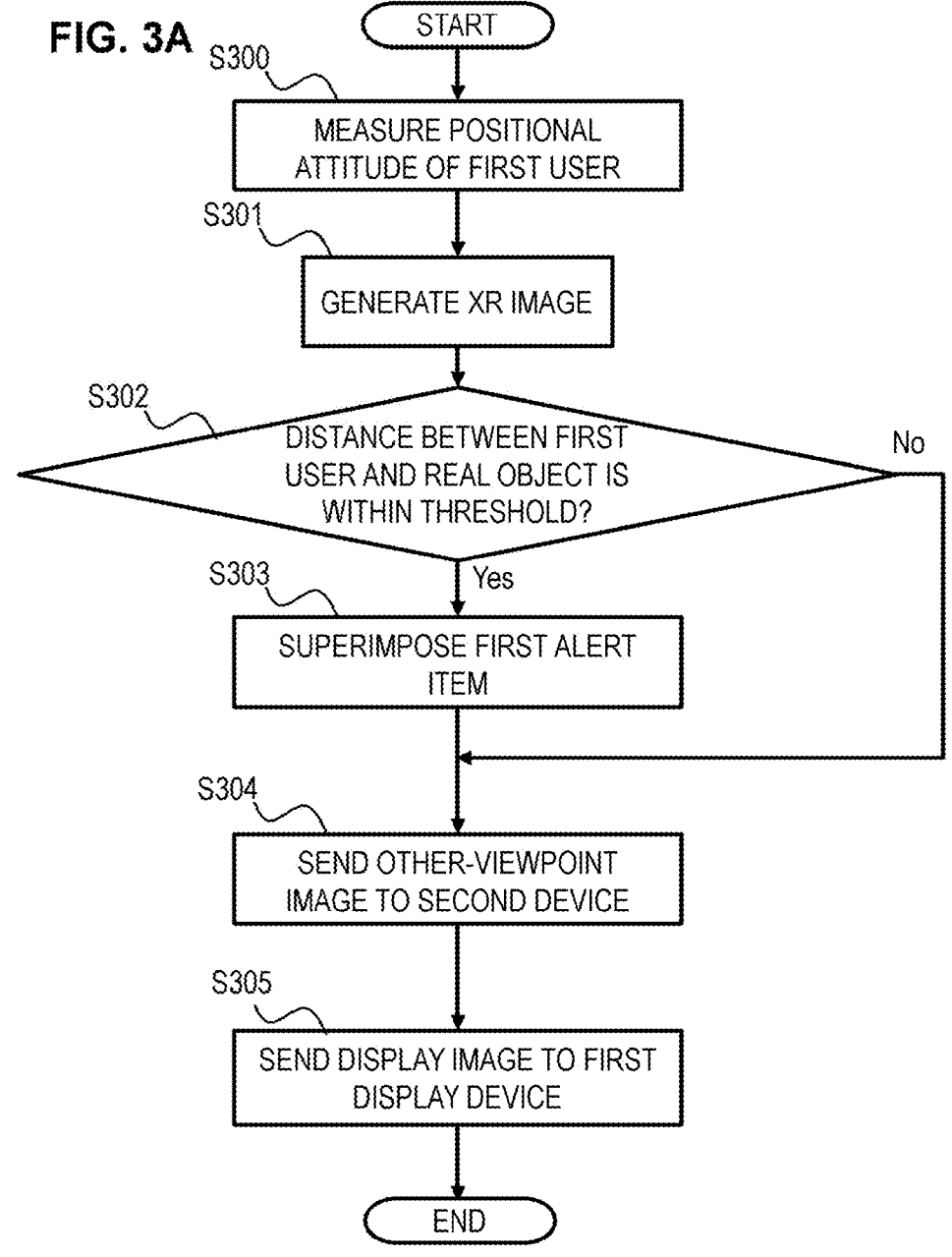
FIGS. 3A and 3B are flow charts of display control processing according to Embodiment 1.
Figure 3B:
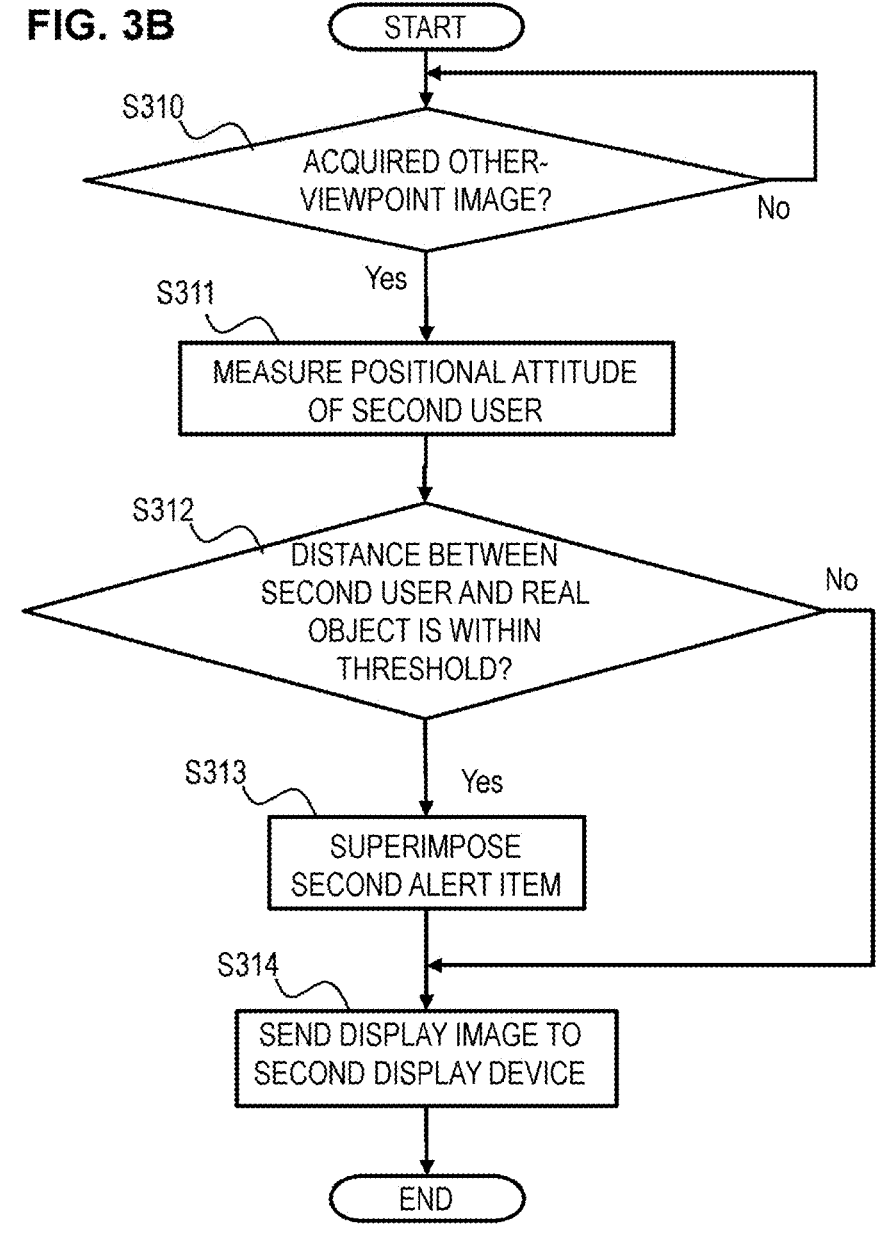

Processing to control display of the first device 100 and the second device 200 (display control processing) will be described with reference to the flow charts in FIG. 3A and FIG. 3B. FIG. 3A indicates processing executed by the first device 100. FIG. 3B indicates processing executed by the second device 200.

Figure 4:
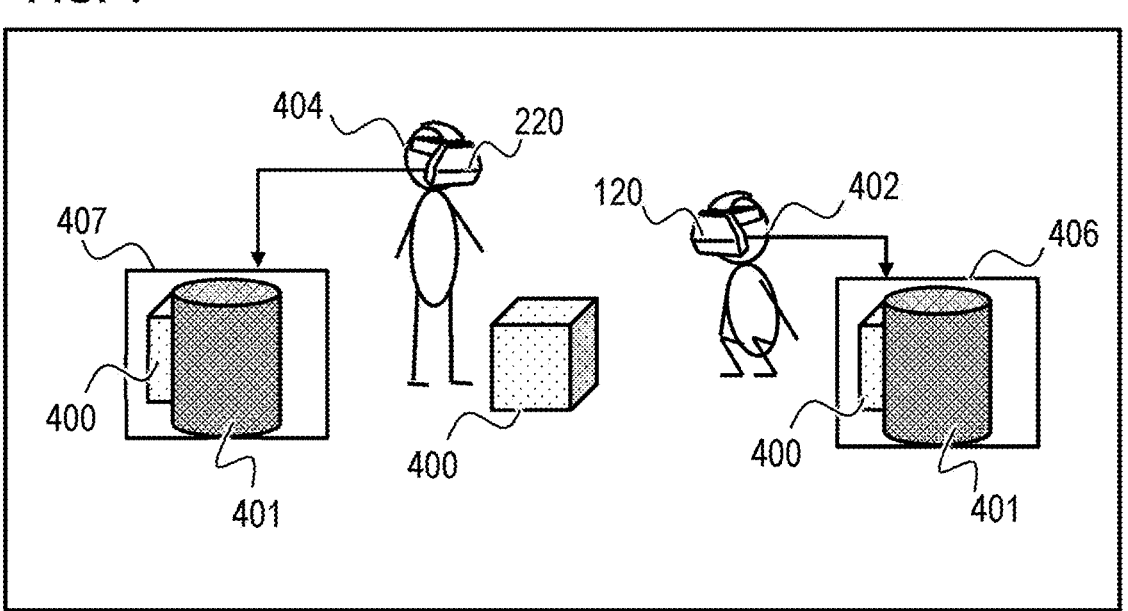
FIG. 4 is a diagram for describing the display control processing according to Embodiment 1.

In the description of the display control processing, it is assumed that a first user 402 is wearing the display device 120 on their head, and the second user 404 is wearing the display device 220 on their head, as illustrated in FIG. 4. The first user 402 is viewing an XR image 406 displayed on the display device 120. The XR image 406 here is an image of a virtual space, including a real object 400 and a virtual object 401. The second user 404 is viewing an XR image 407 displayed on the display device 220. The content of the XR image 407 is the same as the content of the XR image 406, except for an alarm item (display item). The XR image 407 may be an image of which image quality or frame rate is different from the XR image 406, or may be an image in a range of a part of the XR image 406.

The processing executed by the first device 100 will be described first with reference to the flow chart in FIG. 3A. The processing in the flow chart in FIG. 3A is started each time the image acquisition unit 101 acquires a real image corresponding to one frame.

In step S300, the measurement unit 102 acquires a real image from the image acquisition unit 101. The measurement unit 102 measures (estimates) the positional attitude of the first user 402 based on the real image.

In step S301, the image generation unit 107 generates an XR image based on the attitude of the display device 120. Specifically, in the real space indicated by the real image, the image generation unit 107 generates an XR image where a virtual object is disposed at a position based on the attitude (positional attitude) of the display device 120.

In step S302, the alert determination unit 104 determines whether the possibility of collision between the first user 402 and the real object 400 is higher than a threshold Th. Specifically, the alert determination unit 104 determines whether or not the distance between the first user 402 and the real object 400 is within a threshold Th1 (performs first alert determination). If the distance between the first user 402 and the real object 400 is determined to be within the threshold Th1, it is determined that the possibility of collision between the first user 402 and the real object 400 is higher than the threshold Th, and processing advances to step S303. If the distance between the first user 402 and the real object 400 is determined to be larger than the threshold Th1, processing advances to step S304.

Figure 5A:
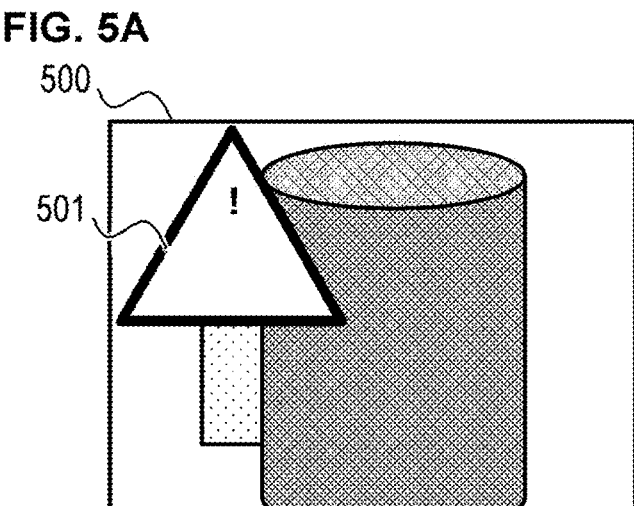
FIGS. 5A and 5B are diagrams for describing an alert according to Embodiment 1.

In step S303, the image generation unit 107 superimposes a first alert item, to alert that the possibility of collision of the first user 402 is high, on an XR image (XR image based on the attitude of the display device 120), and generates a display image thereby. FIG. 5A indicates an example of the XR image after the processing in step S303, and the first alert item 501, having a triangular shape, has been superimposed on the XR image 500.

In step S304, the shared image transmission unit 110 sends the display image generated by the image generation unit 107 to the second device 200 as the "other-viewpoint image". If the distance between the first user 402 and the real object 400 is within the threshold Th1 (YES in step S302) here, the display image is an image generated by superimposing the first alert item on the XR image based on the attitude of the display device 120. On the other hand, if the distance between the first user 402 and the real object 400 is greater than the threshold Th1 (NO in step S302) here, then the display image is an XR image based on the attitude of the display device 120 (XR image on which the first alert item is not superimposed).

In step S305, the image generation unit 107 sends the display image to the display device 120 (first display device). Thereby, the image generation unit 107 controls the display unit 122 such that the display image is displayed.

Next, the processing executed by the second device 200 will be described with reference to the flow chart in FIG. 3B. The processing in the flow chart in FIG. 3B is started each time the image acquisition unit 201 acquires a real image corresponding to one frame.

In step S310, the shared image acquisition unit 205 determines whether the "other-viewpoint image" is acquired from the first device 100. If it is determined that the "other-viewpoint image" is acquired, processing advances to step S311. If it is determined that the "other viewpoint image' is not acquired, the processing in step S310 is repeated. In the case when it is determined that the "other-viewpoint image" is not acquired, the shared image acquisition unit 205 may further request the shared image transmission unit 110 to send the "other-viewpoint image".

In step S311, the measurement unit 202 acquires a real image from the image acquisition unit 201. The measurement unit 202 measures the positional attitude of the second user 404 based on the real image.

In step S312, the alert determination unit 204 determines whether the possibility of collision between the second user 404 and the real object 400 is higher than a threshold Th. Specifically, the alert determination unit 204 determines whether or not the distance between the second user 404 and the real object 400 is within a threshold Th2 (predetermined distance) (performs second alert determination). If the distance between the second user 404 and the real object 400 is determined to be within the threshold Th2, it is determined that the possibility of collision between the second user 404 and the real object 400 is higher than the threshold Th, and processing advances to step S313. If the distance between the second user 404 and the real object 400 is determined to be greater than the threshold Th2, it is determined that the possibility of collision between the second user 404 and the real object 400 is the threshold Th or less, and processing advances to step S314.

In step S312, it is sufficient if the alert determination unit 204 can determine whether or not the possibility of collision between the second user 404 and the real object 400 is higher than the threshold Th. Hence, the above mentioned "distance between the second user 404 and the real object 400" may be interpreted as a "value determined by dividing the distance between the second user 404 and the real object 400 by the speed of the second user 404 and the real object 400 approaching each other (approaching speed) (=time it takes until collision)". This is because the possibility of collision becomes higher as the approaching speed becomes faster. In other words, by this interpretation, the alert determination unit 204 can determine the possibility of collision with even higher accuracy. This interpretation is also applicable to the determination of the possibility of collision between the first user 402 and the real object 400 (step S302).

In step S313, the display control unit 206 superimposes a second alert item on the "other-viewpoint image" acquired by the shared image acquisition unit 205, to alert that the possibility of collision of the second user is high. The second alert item here is an alert item that is different from the first alert item. For example, the second alert item is an alert item that is more prominent than the first alert item.

Figure 5B:
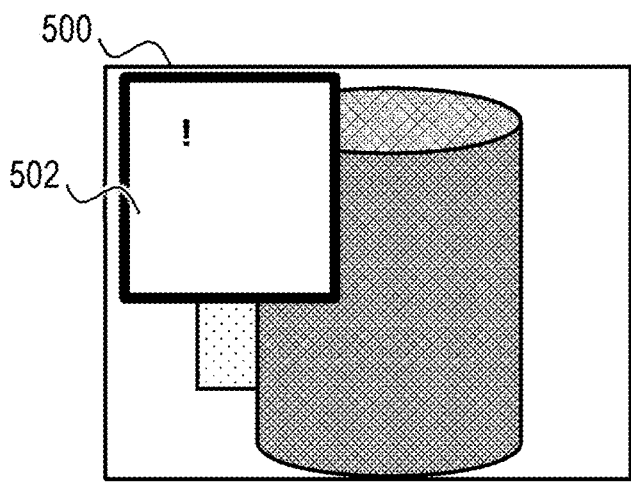

In the case when the possibility of collision of the first user 402 is higher than a predetermined value, the "other-viewpoint image" acquired by the shared image acquisition unit 205 is an XR image, including the first alert item 501, as illustrated in FIG. 5A. In such a case, the display control unit 206 superimposes the second alert item 502 on the XR image 500 to completely cover the first alert item 501, as illustrated in FIG. 5B. Thereby, the second user 404 can recognize only the second alert item 502 in the XR image displayed on the display device 220.

In step S314, the display control unit 206 sends the "other-viewpoint image" to the display device 220 (second display device) as the display image. Thereby the display control unit 206 controls the display unit 222 so as to display the display image.

According to Embodiment 1, in the display device viewed by a specific user, the information processing system 1 differentiates the display forms between the first alert item to alert the "other-viewpoint sharing user", and the second alert item to alert this specific user. Thereby, the user viewing the XR image based on the display device held by another user can recognize to whom the alert is targeted.

In Embodiment 1, the information processing system 1 changes icons between the first alert item and the second alert item, as illustrated in FIG. 5A and FIG. 5B. However alert items (display items) in any display form may be used only if the user can recognize whether the possibility of collision is about this user or about the "other-viewpoint sharing user". For example, the first alert item and the second alert item may be message windows including mutually different messages. One of the first alert item and the second alert item may be an icon and the other may be a message window.

Furthermore, the display control unit 206 may differentiate the display form (notification form) of the alert item between the case where the possibility of collision of the second user with an object (object other than a person) is higher than the threshold Th, and the case when the possibility of collision of the second user with a person is higher than the threshold Th. Specifically, damage due to collision between persons is more likely to be greater. Therefore, for example, the display control unit 206 makes the second alert item larger and have a brighter color in the case where the possibility of collision of the second user with a person is higher than the threshold Th, than in the case when the possibility of collision of the second user with an object is higher than the threshold Th. The display form of the alert item may be differentiated between the case where the possibility of collision between a specific user and the second user, (not between an object and a person), is higher than the threshold Th, and the case when the possibility of collision between an object other than the specific user and the second user is higher than the threshold Th. Here the specific user may be the first user, or a user using the display device to view the XR image (a display device that can acquire the "different viewpoint image" from the first device).

(Modification 1)

In Embodiment 1, even if the first alert item is included in the "other-viewpoint image" sent from the shared image transmission unit 110, the display control unit 206 superimposes the second alert item, which is different from the first alert item, on the "other-viewpoint image". Thereby the second user can recognize whether the first user, which is the "other-viewpoint sharing user" has the possibility of collision, or the user themselves (second user) has the possibility of collision. However, in a case when the first alert item is included in the "other-viewpoint image" send from the shared image transmission unit 110, the display control unit 206 may overwrite the first alert item, so as to clarify that the "other-viewpoint sharing user" has the possibility of collision. In this case, the display control unit 206 may change the display form of the first alert item, or may superimpose another alert item on the first alert item.

Figure 6:
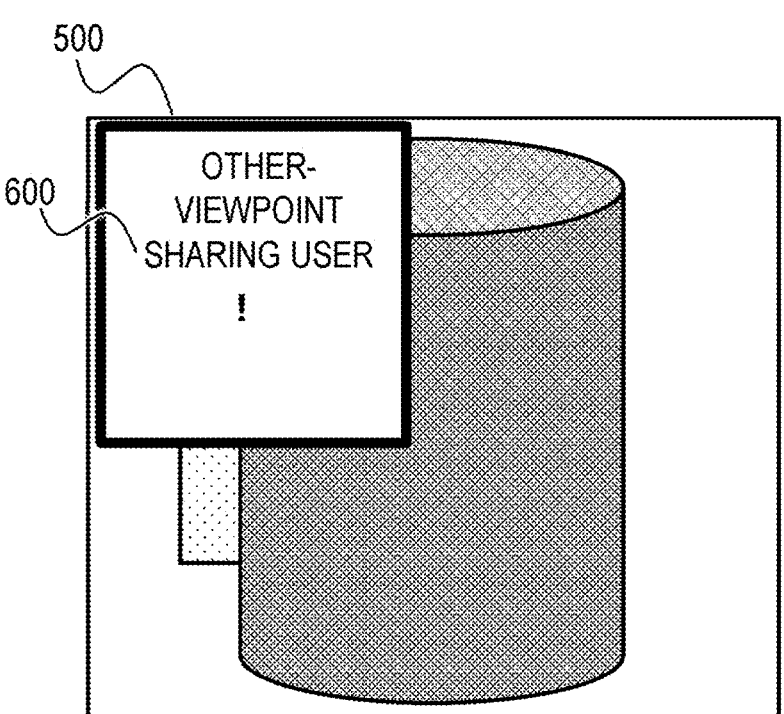
FIG. 6 is a diagram for describing an alert according to Embodiment 1.

For example, the shared image transmission unit 110 transmits the XR image and the first determination result which are linked with each other. Then, the shared image acquisition unit 205 acquires the XR image and the first determination result. After this, the display control unit 206 determines whether a high possibility of collision is alerted based on the first determination result. If it is determined that a high possibility of collision is alerted, the display control unit 206 displays an alert item 600, which indicates the high possibility of collision of the "other-viewpoint sharing user", by text, as illustrated in FIG. 6.

As a consequence, when the user is viewing an XR image based on the display device held by another user, the user can more accurately recognize which one of the user and the "other-viewpoint sharing user" has the possibility of collision.

Embodiment 2

The information processing system 1 described in Embodiment 1 alerts the high possibility of collision in a case when the second user is viewing an XR image (having an XR experience with the XR image) based on the display device held by the first user. An information processing system 2, to be described in Embodiment 2, on the other hand, can switch the XR image viewed by the second user between an XR image based on the display device held by the second user and an XR image based on the display device held by the first user.

Figure 7:
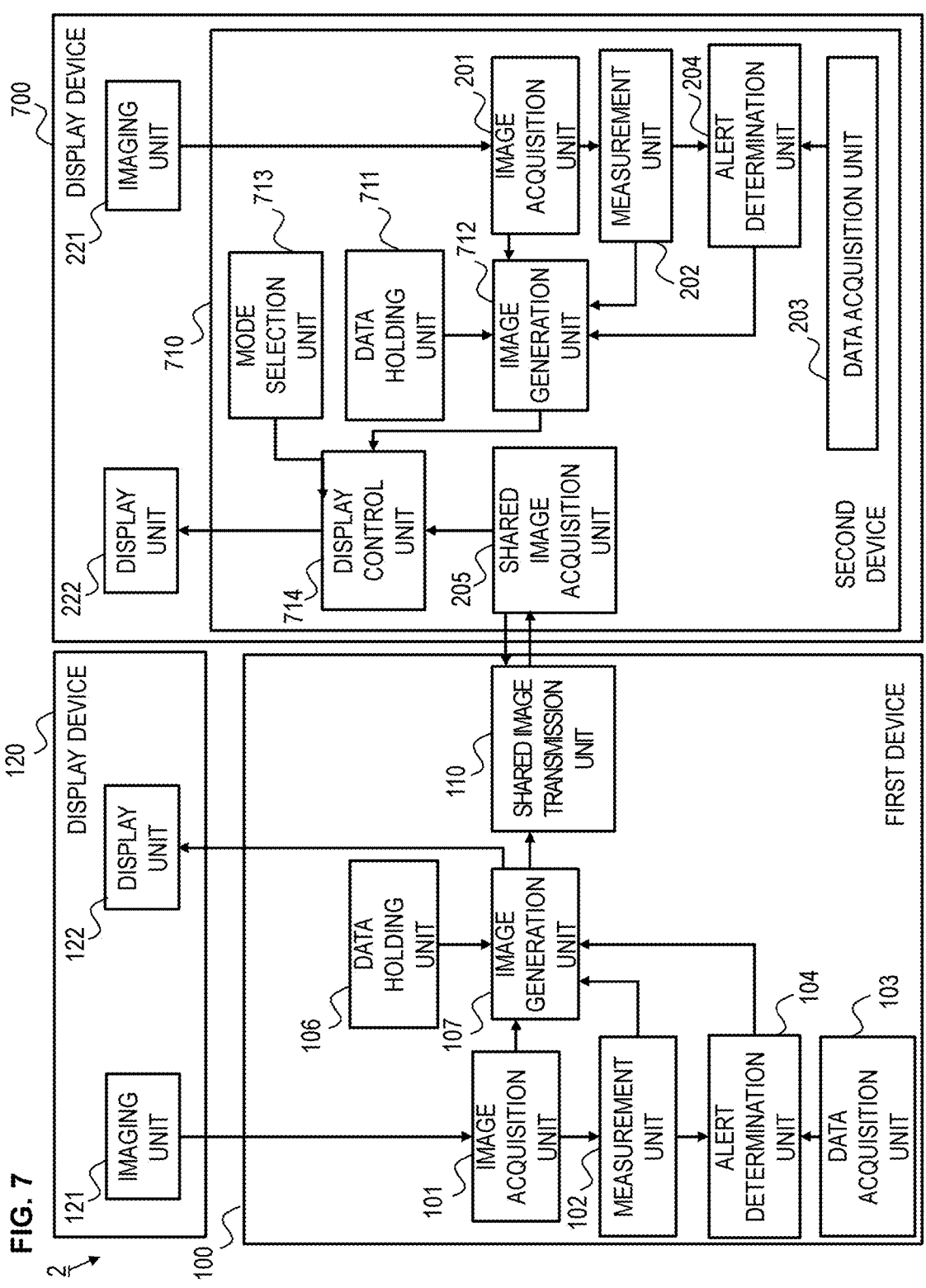
FIG. 7 is a block diagram of an information processing system according to Embodiment 2.

FIG. 7 is a block diagram of the information processing system 2 according to Embodiment 2. In FIG. 7, only composing elements different from Embodiment 1 (FIG. 1) will be described in detail, and a description of the other composing elements will be omitted.

The information processing system 2 includes the display device 120, the first device 100, and a display device 700. The first device 100 and the display device 700 are communicably connected.

An internal configuration of the display device 700 will be described with reference to FIG. 7. The display device 700 includes an imaging unit 221, a display unit 222, and a second device 710. In Embodiment 2, it is assumed that the display device 700 is a tablet terminal. The display device 700, however, may be any device as long as the imaging unit 221, the display unit 222 and the image processing unit (second device 710) are included. For example, the display device 700 may be such a portable terminal as a smartphone, or may be a standalone type HMD.

Figure 8A:
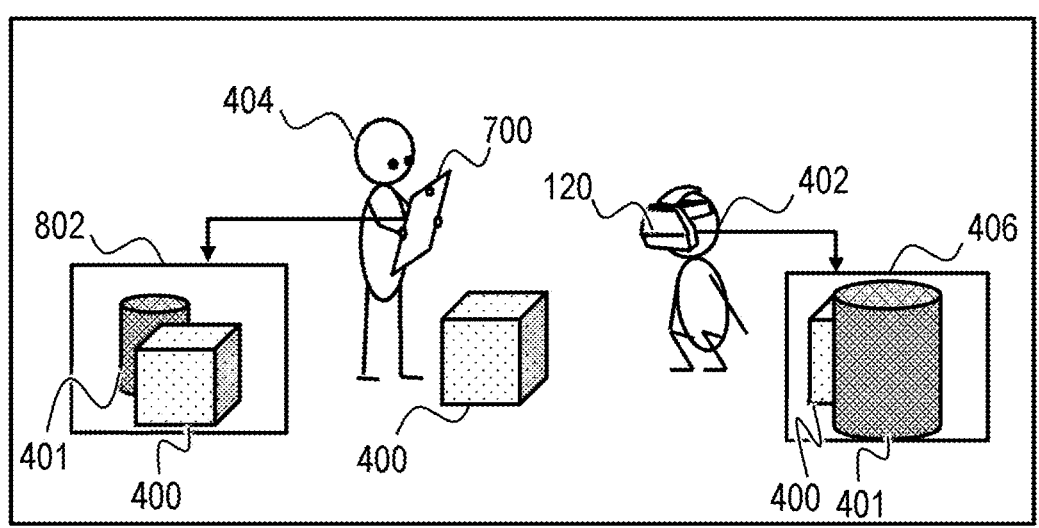
FIGS. 8A and 8B are diagrams for describing display control processing according to Embodiment 2.
Figure 8B:
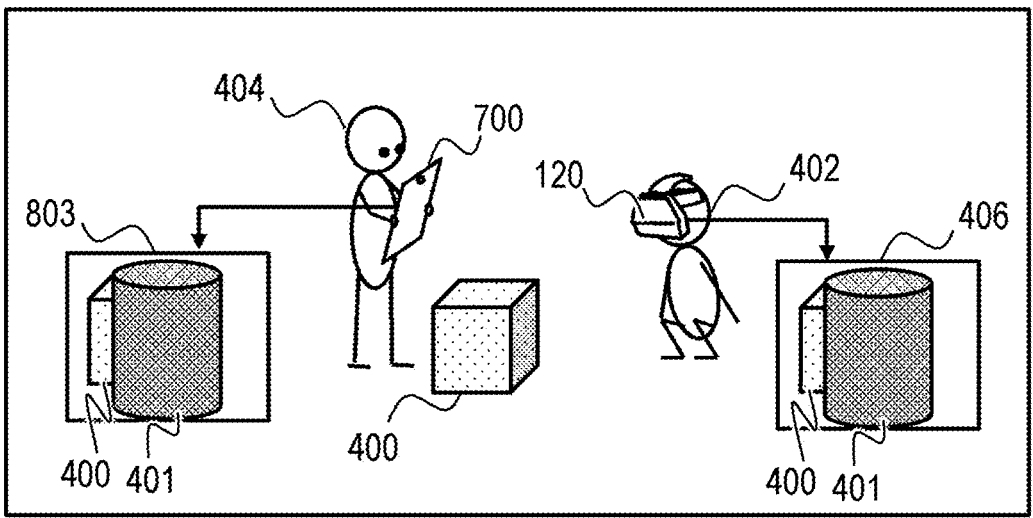

FIG. 8A and FIG. 8B are diagrams indicating an example when the second user 404 is viewing an XR image based on the display device 700 (display device held by the second user 404), and an example when the second user 404 is viewing an XR image based on the display device 120 held by the first user 402. In FIG. 8A and FIG. 8B, a composing element the same as FIG. 4 is denoted with a same reference number, and description of this composing element will be omitted.

FIG. 8A is an example when the second user 404 is viewing an XR image based on the display device 700. The XR image 802 displayed on the display device 700 is an XR image generated by superimposing an image of a virtual object 401 on a real image acquired by the imaging unit 221 of the display device 700.

FIG. 8B is an example when the second user 404 is viewing an XR image based on the display device 120 held by the first user 402. The XR image 803 displayed on the display device 700 is an XR image generated by superimposing an image of the virtual object 401 on a real image acquired by the imaging unit 121 of the display device 120.

A data holding unit 711 holds data on a virtual space, just like the data holding unit 106. The data holding unit 711 outputs the data on the virtual space to an image generation unit 712.

The image generation unit 712 generates an XR image based on a real image generated by the imaging unit 221 capturing a real space, just like the image generation unit 107. In the following, an XR image generated by the image generation unit 712 is called a "self-viewpoint image". The image generation unit 712 outputs the "self-viewpoint image" to a display control unit 714.

A mode selection unit 713 selects a display mode of the display device 700. Specifically, the mode selection unit 713 selects either a display mode in which the "self-viewpoint image" generated by the image generation unit 712 is displayed, or a display mode in which the "other-viewpoint image" (XR image) generated by the first device 100 is displayed. In the following, the display mode, to display the "self-viewpoint image" generated by the image generation unit 712, is called the "self-viewpoint mode". The display mode, to display the "other-viewpoint image" generated by the first device 100, is called the "other-viewpoint mode". The mode selection unit 713 outputs information on the selected display mode to the display control unit 714.

In the case when the other-viewpoint mode is selected, the mode selection unit 713 selects the "other-viewpoint sharing user" next. Here, a user who can be selected as the "other-viewpoint sharing user" is only a user associated with information processing device (display device) in which the self-viewpoint mode is selected. In this case, the mode selection unit 713 outputs the information on the "other-viewpoint sharing user" to the display control unit 714.

The display control unit 714 controls the display image in accordance with the information on the display mode acquired from the mode selection unit 713. In accordance with the display mode of the display device 700, the display control unit 714 requests the image generation unit 712 or the shared image acquisition unit 205 to acquire the "self-viewpoint image" or the 'other-viewpoint image". Then, the display control unit 714 generates the display image based on the acquired image. The display image is generated by executing the processing in accordance with the later mentioned flow chart (see FIG. 9B). The display control unit 714 outputs the display image to the display unit 222.

Figure 9A:
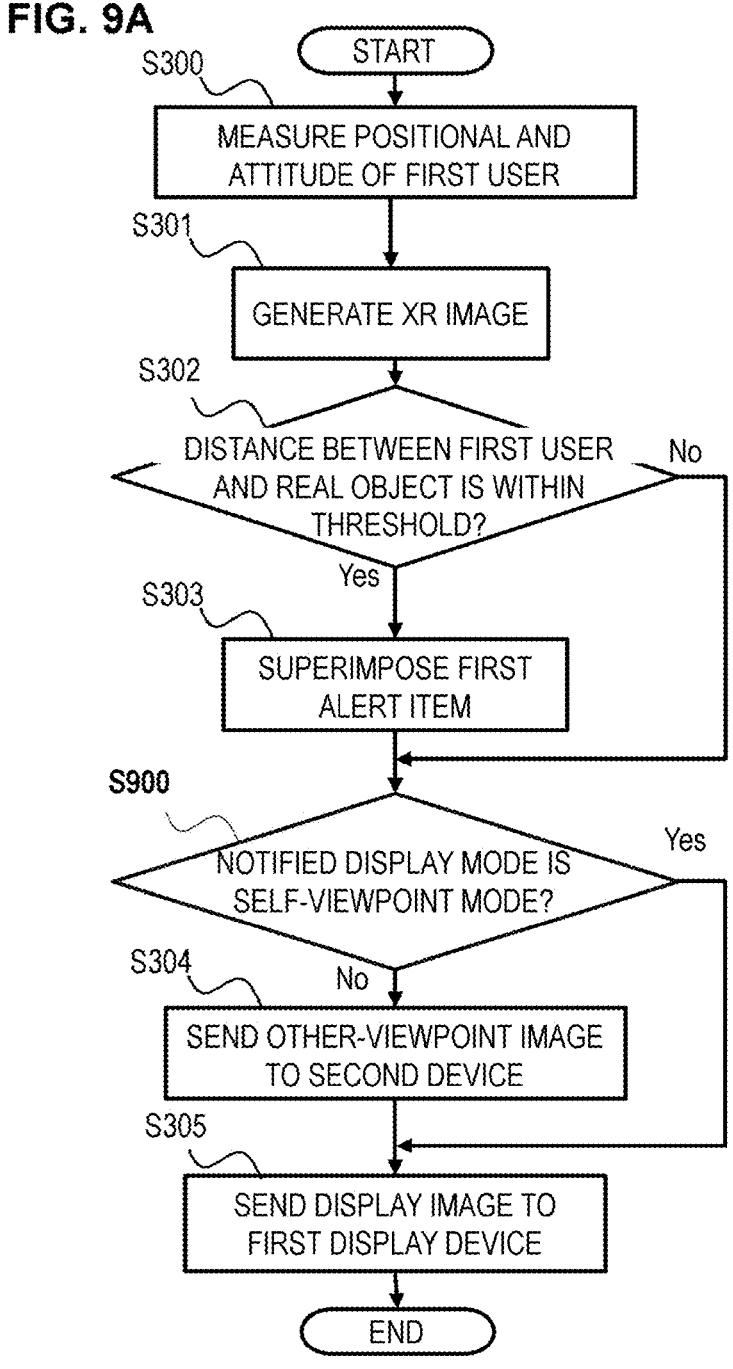
FIGS. 9A and 9B are flow charts of the display control processing according to Embodiment 2.
Figure 9B:
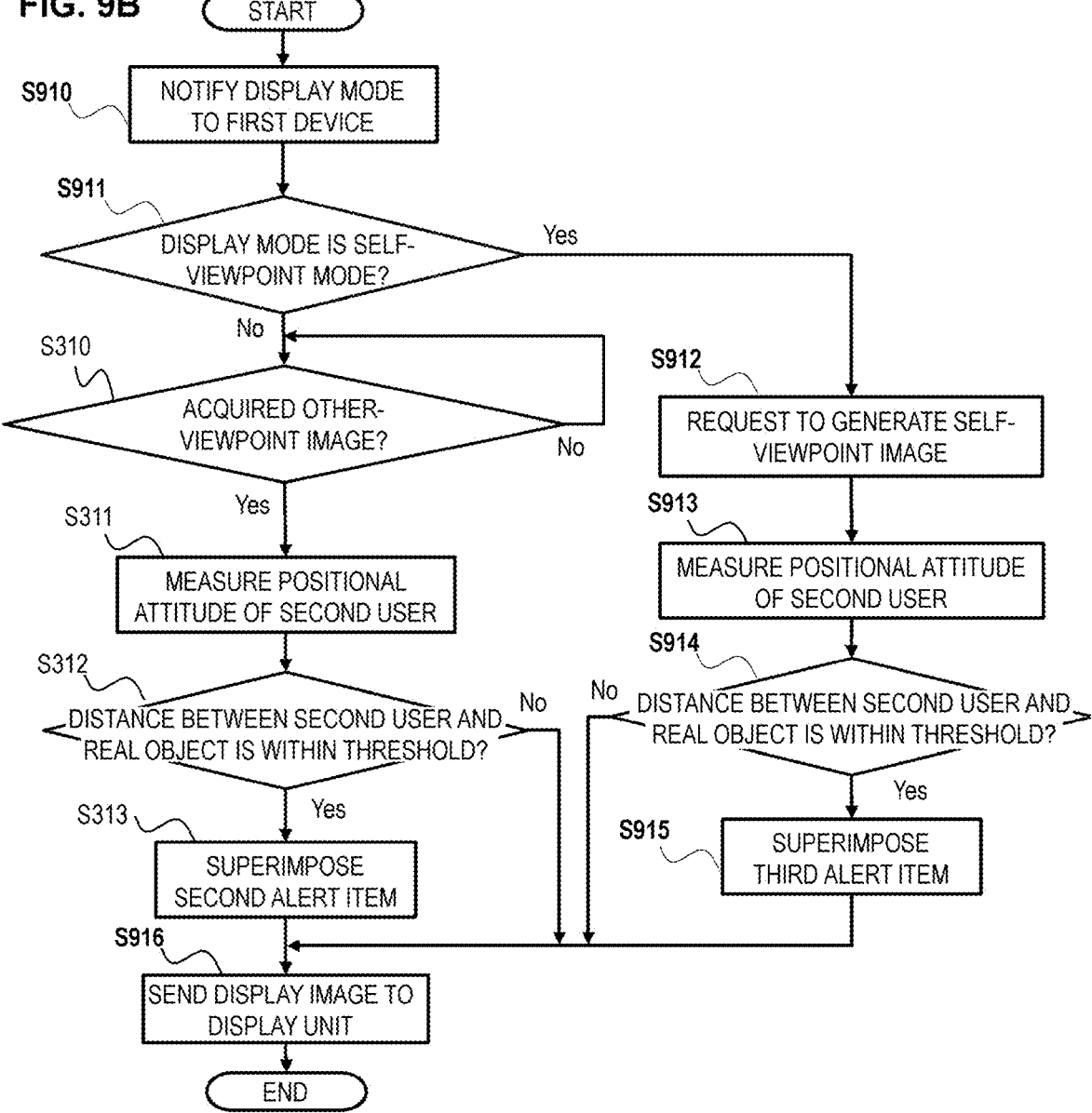

Processing to control display by the first device 100 and the second device 710 (display control processing) will be described with reference to the flow charts in FIG. 9A and FIG. 9B. FIG. 9A indicates processing executed by the first device 100. FIG. 9B indicates processing executed by the second device 710. In the following, a description on steps the same as FIG. 3A and FIG. 3B will be omitted.

The processing executed by the first device 100 will be described first with reference to the flow chart in FIG. 9A. The processing in the flow chart in FIG. 9A is started each time the image acquisition unit 101 acquires a real image corresponding to one frame.

In step S900, the shared image transmission unit 110 determines the display mode of the display device 700 based on the notification of the display mode from the shared image acquisition unit 205. If it is determined that the display mode of the display device 700 is the self-viewpoint mode, processing advances to step S305. If it is determined that the display mode of the display device 700 is the other-viewpoint mode, processing advances to step S304.

Next, the processing executed by the second device 710 will be described with reference to the flow chart in FIG. 9B. The processing in the flow chart in FIG. 9B is started each time the image acquisition unit 201 acquires a real image corresponding to one frame.

In step S910, the shared image acquisition unit 205 notifies the display mode selected by the mode selection unit 713 (display mode of the display device 700) to the first device 100. If the display mode of the display device 700 is the other-viewpoint mode, the shared image acquisition unit 205 requests the shared image transmission unit 110 to send the "other viewpoint image" by notifying the display mode.

In step S911, the display control unit 714 determines the display mode selected by the mode selection unit 713. Processing advances to step S912 if it is determined that the mode selected by the mode selection unit 713 is the self-viewpoint mode. Processing advances to step S310 if it is determined that the mode selected by the mode selection unit 713 is the other-viewpoint mode.

In step S912, the display control unit 714 requests the image generation unit 712 to generate the "self-viewpoint image". Responding to the request from the display control unit 714, the image generation unit 712 generates the "self-viewpoint image" (XR image) based on the real image acquired by the imaging unit 221.

In step S913, the measurement unit 202 measures the positional attitude of the second user, just like step S311.

In step S914, the alert determination unit 204 determines whether or not the distance between the second user and a real object is within a threshold Th2, just like step S312. If the distance between the second user and the real object is determined to be within the threshold Th2 (that is, if it is determined that the possibility of collision between the second user and the real object is higher than the threshold Th), processing advances to step S915. If the distance between the second user and the real object is determined to be greater than the threshold Th2, processing advances to step S916.

Figure 10:
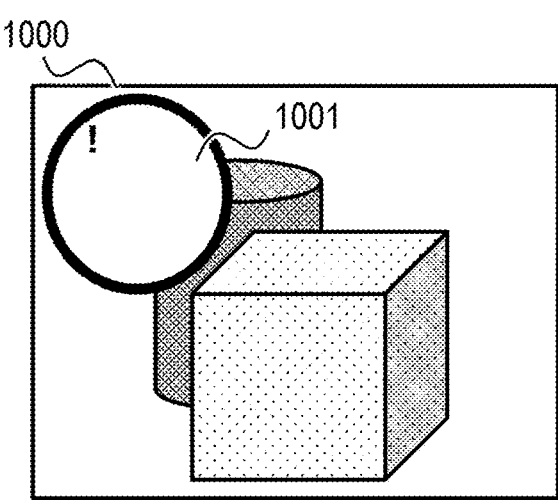
FIG. 10 is a diagram for describing an alert according to Embodiment 2.

In step S915, the display control unit 714 superimposes a third alert item on the "self-viewpoint image" to alert that the possibility of collision of the second user is high. For example, a third alert item 1001 is superimposed on the XR image 1000, as illustrated in FIG. 10. The third alert item 1001 is a display item of which form is different from the first alert item 501 and the second alert item 502, as illustrated in FIG. 5A and FIG. 5B.

In step S916, the display control unit 714 sends the display image to the display unit 222. Here, if the display mode of the display device 700 is the self-viewpoint mode, the display image is the "self-viewpoint image", and if the display mode of the display device 700 is the other-viewpoint mode, the display image is the "other-viewpoint image".

In Embodiment 2, it is assumed that the first alert item, the second alert item and the third alert item are alert items in mutually different predetermined forms. However, the user may arbitrarily determine the form of each alert item. For example, a setting unit (not illustrated) of the first device 100 or a setting unit (not illustrated) of the second device 710 may set a form of each alert item in accordance with the operation by the user.

The setting unit calls up the GUI to set the information on the alert item (GUI to display the alert item and disposition of the alert item). Then, the setting unit sets the information on the alert item in accordance with the operation of the user. Based on the GUI of the first alert item and disposition thereof, the image generation unit 107 superimposes the first alert item on the XR image. The setting unit of the second device 710 outputs information on the GUI of the second alert item and the third alert item and dispositions thereof to the display control unit 714. If the display mode is the self-viewpoint mode, the display control unit 714 superimposes the third alert item on the "self-viewpoint image" based on the acquired information. If the display mode is the other-viewpoint mode, the display control unit 714 superimposes the second alert item on the "other-viewpoint image" based on the acquired information.

By differentiating the forms of the first alert item, the second alert item and the third alert item like this, the user can accurately recognize which one of the self and the "other-viewpoint sharing user" has the possibility of collision, and the display mode of the display device 700.

(Modification 2)

In Modification 2, the information processing system 2 switches the image to be displayed on the display unit 222 in accordance with the possibility of collision between the second user and a real object. If the display mode is the other-viewpoint mode, the second user cannot view the surroundings thereof in the real space. Hence the possibility of collision with a real object increases. Therefore, in a case when the distance between the second user and a real object is within a threshold (withing a predetermined distance), the information processing system 2 may use the "self-viewpoint image" (XR image based on the real image captured by the imaging unit 221) as the display image.

Figure 11:
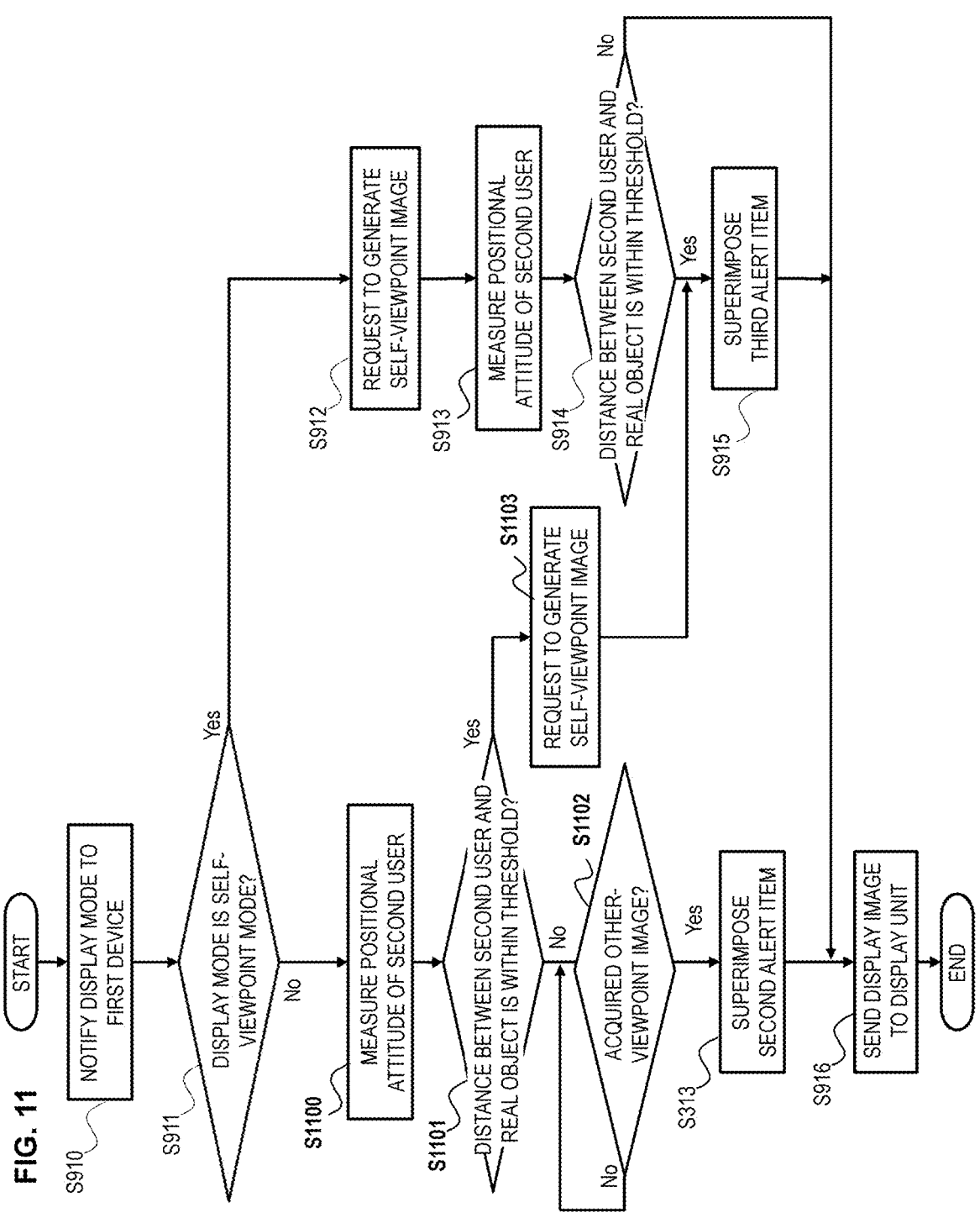
FIG. 11 is a flow chart of display control processing according to Modification 2.

The display control processing executed by the second device 710 according to Modification 2 will be described with reference to a flow chart in FIG. 11. In the following, a step the same as FIG. 3B or FIG. 9B is denoted with a same reference number, and a description thereof will be omitted.

The processing in step S1100 is started when it is determined that the display mode of the display device 700 is the other-viewpoint mode in step S911. In step S1100, the measurement unit 202 measures the positional attitude of the second user, just like steps S311 and S913.

In step S1101, the alert determination unit 204 determines whether or not the distance between the second user and a real object is within a threshold Th2. If the distance between the second user and the real object is determined to be within the threshold Th2 (that is, if it is determined that the possibility of collision between the second user and the real object is higher than the threshold Th), processing advances to step S1103. If the distance between the second user and the real object is determined to be greater than the threshold Th2, processing advances to step S1102.

In step S1102, the display control unit 714 determines whether the shared image acquisition unit 205 acquired the "other-viewpoint image". Processing advances to step S916 if it is determined that the "other-viewpoint image" is acquired. Processing in step S1102 is repeated if it is determined that the "other-viewpoint image' is not acquired.

In step S1103, the display control unit 714 requests the image generation unit 712 to generate the "self-viewpoint image", just like step S912. Responding to the request from the display control unit 714, the image generation unit 712 generates the "self-viewpoint image" based on the real image acquired by the imaging unit 221.

As described above, in a case when there is the possibility of collision between the second user and a real object when the second user is viewing an XR image based on the display device held by the first user, the information processing system 2 switches this XR image to an XR image based on the display device held by the second user. Thereby, the second user can recognize the surroundings, and recognize whether the second user themself has the possibility of collision.

Figure 12:
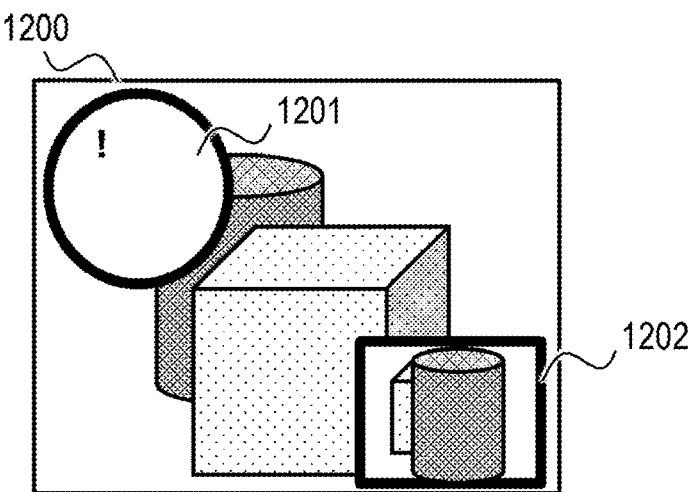
FIG. 12 is a diagram for describing an alert according to Modification 2.

In Modification 2, in the case when the display mode of the display device 700 is the other-viewpoint mode, and the distance between the second user and the real object is within the threshold Th2, the information processing system 2 uses only the "self-viewpoint image" as the display image, but may also use the "other-viewpoint image". In other words, in the case when the display mode is the other-viewpoint mode, and the distance between the second user and a real object is within the threshold Th2, the information processing system 2 may superimpose the 'other-viewpoint image" and the alert item on a part of the "self-viewpoint image". For example, as illustrated in FIG. 12, the display control unit 714 may superimpose an alert item 1201 and an XR image 1202, which is the "other-viewpoint image" on a part of an XR image 1200, which is the "self-viewpoint image". This can be implemented by the display control unit 714 acquiring the "other-viewpoint image" from the shared image acquisition unit 205, and further performing the processing to superimpose the "other-viewpoint image" on the display image.

(Modification 3)

In Modification 2, in the case when the display mode of the display device 700 is the other-viewpoint mode, and the distance between the second user and the real object is within the threshold Th2, the information processing system 2 switches the display image of the display device 700 from the "other-viewpoint image" to the "self-viewpoint image". However, the information processing system 2 may change the display mode in such case.

That is, in the case when the display mode of the display device 700 is the other-viewpoint mode, and the distance between the second user and the real object is within the threshold Th2, the mode selection unit 713 switches the display mode to the self-viewpoint mode.

Thereby, the image to be displayed on the display device 700 can also be switched to the "self-viewpoint image" if the possibility of collision of the second user is high when the second user is viewing the "other-viewpoint image". Then, the second user can recognize whether the possibility of collision of themself is high.

Further, in each embodiment and modification described above, the information processing system alerts the high possibility (danger) of collision by displaying the alert item. Here, in addition to (or instead of) the display of the alert item, the information processing system may perform alert by sound or vibration. In other words, the display control unit may alert the high possibility of collision between the user and the real object by outputting (emitting) a sound from a sound output unit included in the display device, or by vibrating the display device. Further, the information processing system may differentiate the sound or the vibration pattern depending on the display mode. Furthermore, notification to alert the other-viewpoint sharing user may be performed by display of the alert item alone, and notification to alert a specific user may be performed by sound or vibration in addition to this display of the alert item.

Moreover, in each embodiment and modification described above, the XR image is an image of a real space indicated by a real image, on which a virtual object indicated by the virtual space data is disposed. However, the XR image may be a VR image as long as the image is based on the attitude of the display device. In other words, the XR image may be an image on which the virtual object is disposed based on the attitude of the display device regardless the real image.

According to the present invention, a specific user can be appropriately notified of the possibility of collision in a case when the specific user is viewing an image corresponding to another user.

In the above description, the phrase "processing advances to step S1 if A is B or more, and processing advances to step S2 if A is less (lower) than B" may be interpreted as "processing advances to step S1 if A is larger (higher) than B, and processing advances to step S2 if A is B or less". Further, "processing advances to step S1 if A is greater (higher) than B, and processing advances to step S2 if A is B or less" may be interpreted as "processing advances to step S1 if A is B or more, and processing advances to S2 if A is less (lower) than B". In other words, as long as no inconsistency is generated, "A or more" may be interpreted as "A or greater (higher, longer, more) than A", or may be interpreted as "greater (higher, longer, more) than A". Further, "A or less" may be interpreted as "A or smaller (lower, shorter, less) than A", or may be interpreted as "smaller (lower, shorter, less) than A". Furthermore, "larger (higher; longer; more) than A" may be interpreted as "A or more", and "smaller (smaller, shorter, less) than A" may be interpreted as "A or less".

Whereas the present invention has been described with reference to the preferred embodiments thereof, the present invention is not limited to these specific embodiments, and includes various forms in a scope not departing from the spirit of the invention. The above embodiments may be partially combined with each other if required.

The above processors are processors in the broadest sense and include both general purpose and specialized processors. The general-purpose processors include, for example, a CPU (Central Processing Unit), an MPU (Micro Processing Unit), and a DSP (Digital Signal Processor). The specialized processors include, for example, a GPU (Graphics Processing Unit), an ASIC (Application Specific Integrated Circuit), a PLD (Programmable Logic Device), etc. The programmable logic devices are, for example, an FPGA (Field Programmable Gate Array), a CPLD (Complex Programmable Logic Device), etc.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

The present invention is not limited to the embodiments described above, but may be changed and modified in various ways without departing from the spirit and scope of the present invention. Therefore, the following claims will be attached to disclose the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing device comprising:
one or more processors and/or circuitry configured:
to perform acquisition processing to acquire a first image based on an attitude of a first display device used by a first user;
to perform determination processing to determine possibility of collision of a second user;
to perform selection processing to select display mode of a second display device; and
to perform control processing to control the second display device used by the second user,
wherein, in the control processing,
the second display device is controlled to display the first image in a case when a first display mode is selected in the selection processing, and to display a second image based on an attitude of the second display device in a case when a second display mode is selected in the selection processing, and,
in a case when it is determined that the possibility of collision of the second user is high, in the control processing, the second display device is controlled such that the possibility of collision of the second user is notified to the second user using a notification form that is different in accordance with the display mode selected in the selection processing.

2. The information processing device according to claim 1, wherein, in the control processing, the second display device is controlled such that the second user is notified of the possibility of collision of the second user, by emitting a sound from the second display device or by vibrating the second display device.

3. The information processing device according to claim 1, wherein, in the determination processing, possibility of collision between and an object and the second user is determined.

4. The information processing device according to claim 3, wherein, in the control processing, a form of notification, which notifies the second user of the possibility of collision of the second user, differs between a case when a possibility of collision of a user of a user using a specific display device and the second user is high and a case when a possibility of collision of a user other than the user using the specific display device and the second user is high.

5. The information processing device according to claim 3, wherein, in the determination processing, it is determined that the possibility of collision of the second user is high in a case when a distance between the object and the second user is shorter than a predetermined distance.

6. The information processing device according to claim 1, wherein, in a case when the second user is not viewing at the second display device, in the control processing, the second display device is controlled not to notify the second user of the possibility of collision of the second user.

7. The information processing device according to claim 1, wherein the second display device acquires a captured image by imaging a space in front of the second display device, and the one or more processors and/or circuitry is further configured to perform generation processing to generate the second image based on the captured image.

8. The information processing device according to claim 7, wherein, in a case when the second display mode is not selected in the selection processing and it is determined that the possibility of collision of the second user is high, in the selection processing, the display mode is switched to the second display mode.

9. The information processing device according to claim 1, wherein the first display device and the second display device are head mounted displays.

10. The information processing device according to claim 1, wherein the first image is an image of which content is the same as that of an image displayed on the first display device.

11. The information processing device according to claim 1, wherein, in the control processing, in a case when it is determined that the possibility of collision of the second user is high, the second display device is controlled such that the second user is notified of the possibility of collision of the second user using a notification form that is different from that in a case when the second user is notified of possibility of collision of the first user.

12. The information processing device according to claim 11, wherein the first image includes a first display item in a case when the second user is notified of the possibility of collision of the first user, and, in a case when it is determined that the possibility of collision of the second user is high, in the control processing, the second display device is controlled such that a second display item, which is different from the first display item, is displayed along with the first image.

13. The information processing device according to claim 12, wherein, in a case when it is determined that the possibility of collision of the second user is high and the first image includes the first display item, in the control processing, the second display device is controlled such that an image generated by superimposing the second display item on the first image is displayed so as to cover the entirety of the first display item.

14. A display device comprising:

a display configured to display an image; and one or more processors and/or circuitry configured:

to perform selection processing to select a display mode from a plurality of display modes; and to perform control processing to control the display, wherein, in the control processing, the second display device is controlled to display the first image in a case when a first display mode is selected in the selection processing, and to display a second image based on an attitude of the second display device in a case when a second display mode is selected in the selection processing, and, in a case when it is determined that the possibility of collision of the second user is high, in the control processing, the second display device is controlled such that the possibility of collision of the second user is notified to the second user using a notification form that is different in accordance with the display mode selected in the selection processing.

15. An information processing method comprising:

acquiring a first image based on an attitude of a first display device used by a first user;

determining possibility of collision of a second user;

selecting a display mode of a second display device; and controlling the second display device used by the second user, wherein, in the controlling, the second display device is controlled to display the first image in a case when a first display mode is selected in the selection processing, and to display a second image based on an attitude of the second display device in a case when a second display mode is selected in the selection processing, and, in a case when it is determined that the possibility of collision of the second user is high, in the control processing, the second display device is controlled such that the possibility of collision of the second user is notified to the second user using a notification form that is different in accordance with the display mode selected in the selection processing.

16. A non-transitory computer readable medium that stores a program, wherein the program causes a computer to execute an information processing method, the information processing method comprising:

acquiring a first image based on an attitude of a first display device used by a first user;

determining possibility of collision of a second user;

selecting a display mode of a second display device; and controlling the second display device used by the second user, wherein, in the controlling, the second display device is controlled to display the first image in a case when a first display mode is selected in the selection processing, and to display a second image based on an attitude of the second display device in a case when a second display mode is selected in the selection processing, and, in a case when it is determined that the possibility of collision of the second user is high, in the control processing, the second display device is controlled such that the possibility of collision of the second user is notified to the second user using a notification form that is different in accordance with the display mode selected in the selection processing.

\* \* \* \* \*